June 30, 1953 — D. M. SMITH — 2,643,752
FEEDER DEVICE FOR EGG CLEANING MACHINES
Filed Dec. 9, 1948 — 2 Sheets-Sheet 1

Inventor
Delbert M. Smith
By Williamson & Williamson
Attorneys

June 30, 1953  D. M. SMITH  2,643,752
FEEDER DEVICE FOR EGG CLEANING MACHINES
Filed Dec. 9, 1948  2 Sheets-Sheet 2

Inventor
Delbert M. Smith
By Williamson & Williamson
Attorneys

Patented June 30, 1953

2,643,752

UNITED STATES PATENT OFFICE 2,643,752

FEEDER DEVICE FOR EGG CLEANING MACHINES

Delbert M. Smith, Morton, Minn.

Application December 9, 1948, Serial No. 64,294

2 Claims. (Cl. 193—40)

1

This invention relates to a feeder mechanism for egg cleaning machines.

The feeder mechanism disclosed in my co-pending application, Serial No. 37,171, filed July 6, 1948, and entitled Egg Cleaning Machine has proved quite satisfactory, but I have now developed an improved feeder mechanism which is disclosed herein and forms the subject matter of this application.

It is an object of my invention to provide a novel and improved feeder mechanism adapted to shift an egg substantially into cleaning position on a cleaning machine and thereafter gently release said egg into said cleaning position and thereby substantially eliminate any jarring of the egg to prevent damage to the air cell therein or crack the shell.

More specifically it is an object to provide a feeder mechanism for egg cleaning machines of the type having a rotary cleaning element and egg-supporting means adapted to retain the egg in cleaning position against said cleaning element, said feeder mechanism being adapted to retain at least one egg therein and having a longitudinally shiftable chute with a cam-operated mechanism for periodically projecting said chute into discharging position in close association with said egg-supporting means and at that point releasing the egg onto said egg-supporting means and thereafter retracting said chute into normal position.

These and other objects and advantages of my invention will more fully appear from the following description made in connection with the accompanying drawings wherein like reference characters refer to similar parts throughout the several views and in which.

Figure 1:
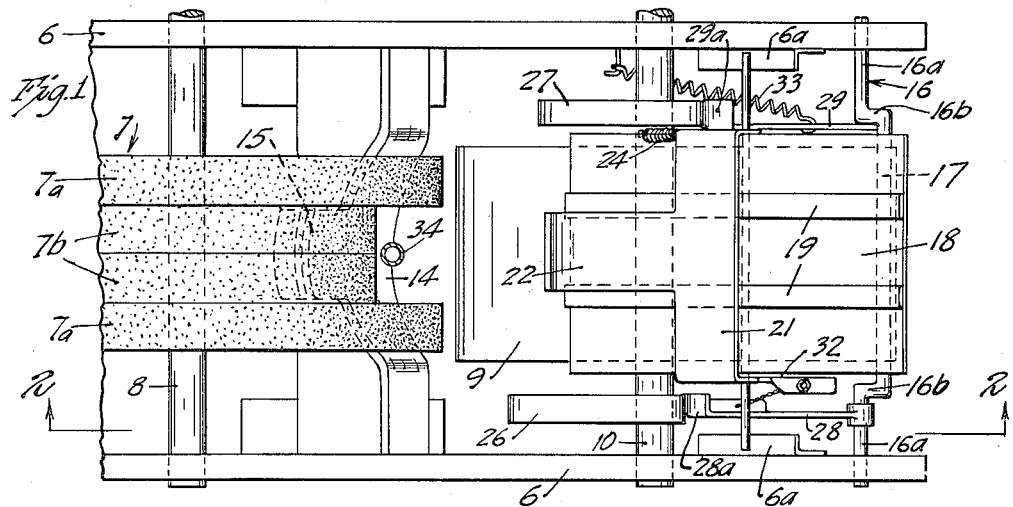
Fig. 1 is a top plan view of my improved feeder as mounted on an egg cleaning machine similar to the machine disclosed in my above identified co-pending application.

As shown in the accompanying drawings, I provide a supporting frame having the sides 6 disposed in spaced substantially parallel relation and having a rotary cleaning brush 7 having a hub 7a fixed to a shaft 8 which is journaled at one

2 end of said frame. The brush 7 has a central peripheral groove 7b formed therein and is constructed as form any soft highly yieldable bristles such as fine wire bristles which are adapted to gently engage the outer surface of an egg. The central recessed portion 7b is adapted to engage the central portion of the egg with substantially the same pressure as is exerted by the outer portions of the brush on the respective end portions of the egg.

A rotary egg-driving member such as the drum 9 described in my above identified co-pending application is mounted in spaced relation to brush 7 on a suitable shaft 10 which is journaled in sides 6 adjacent the other end thereof. The drum 9 has a flattened portion 11, and an egg-discharging recess 12 is transversely formed in said drum adjacent the leading end of said flattened portion 11. This drum 9 has a padded outer surface such as the rubber strip 9a which surrounds the outer periphery thereof and is also fixed in the bottom of the recess 12.

An egg-supporting member 13 is interposed between the cleaning brush 7 and the egg-driving drum 9 and is disposed in closely spaced relation to both members. An elongated egg-retaining recess 14 is formed at the top of supporting member 13 and has a relatively thick cushion fixed therein such as the sponge rubber 14a. The inner portion of egg-supporting member 13 is diminished in width to form an inwardly extending egg-supporting projection 15 extending into the groove 7b of the brush 7 and supporting a portion of the egg therein. The recessed egg-engaging surface slopes outwardly and downwardly away from the cleaning brush 7 and toward the feeder drum 9 to maintain contact between the drum 9 and an egg positioned in said cushioned recess 14.

A novel and improved feeder mechanism which forms the subject matter of this application is mounted between the sides 6 at the extreme rear portion thereof. A crank shaft 16 has a pair of outstanding stub shafts 16a journaled respectively in the sides 6 and the crank arms 16b extend upwardly therefrom. A crank spindle 17 interconnects the upper ends of said crank arms 16b, and a feeder chute 18 is swingably mounted on said spindle 17. A pair of chute rails 19 are fixed to said chute in spaced substantially parallel relation and serve to carry the egg thereon. A pair of spaced upstanding substantially parallel rocker arms 20 and 21 are pivotally connected at their bottom portions at the respective sides of said chute 18 as by the transversely disposed shaft 18a which extends outwardly from the sides of said chute as best shown in Fig. 1. A pair of chute supporting guides 6a are fixed respectively to the sides 6 in opposed angularly disposed relation and receive the outstanding portions of said shaft to support said chute. An egg stop 22 is fixed at the top of said rocker arms 20 and 21, extends forwardly therefrom, and is curved concavely downwardly in the form shown to conform at least slightly to the curvature of an egg and gently retain the same on said chute when in normal position. A padding and retarding flap 23 is attached at the rear end thereof to the rear portion of feeder stop 22 and is made as from a strip of rubber which serves to both protect the egg during retention thereof and thereafter to slightly retard the egg as it is released onto said egg-supporting recess 14. A spring 24 normally holds the stop 22 downwardly against the top of an egg and is attached at one end to an intermediate portion of the rocker arm 20 and at the other end to the side of the chute 18. A pair of abutments 25 fixed respectively at the sides of chute 18 limit the forward motion of the rocker arms 21 and maintain the stop element in a predetermined normal position.

Figure 2:
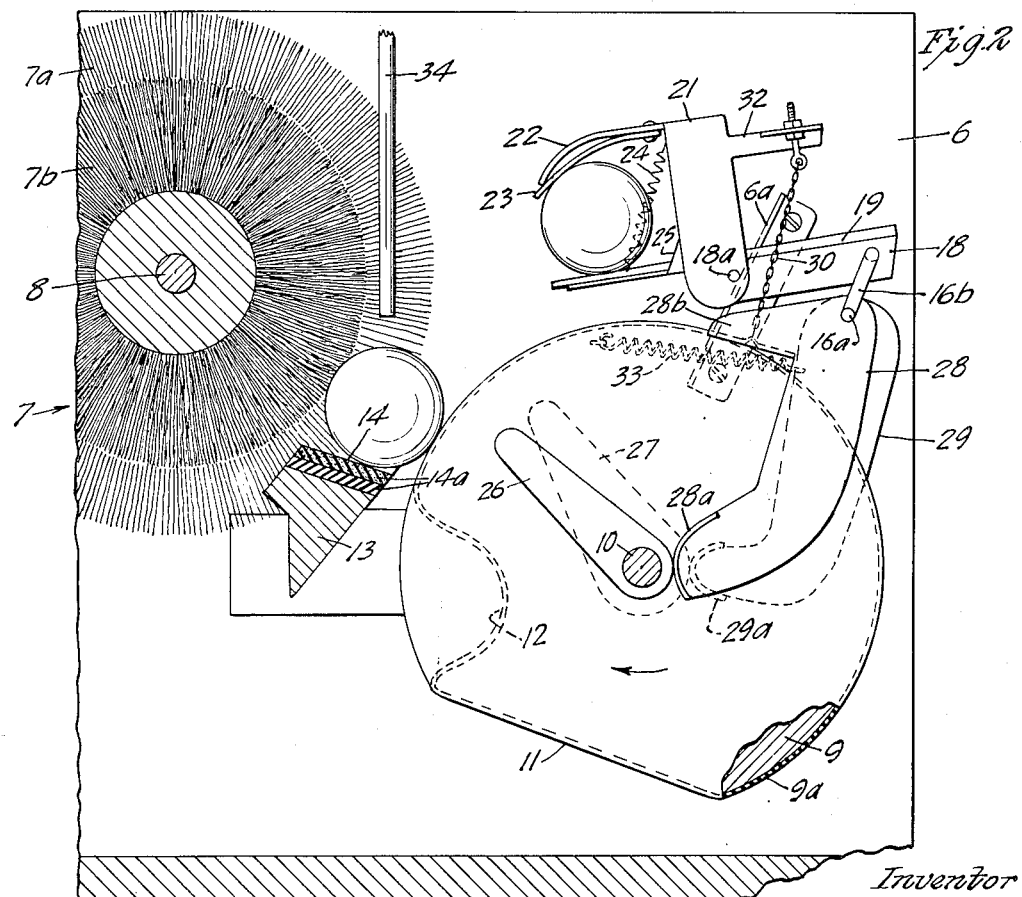
Fig. 2 is a central longitudinal vertical sectional view taken substantially along the line 2—2 of Fig. 1 and showing the feeder mechanism in normal retracted position.
Figure 3:
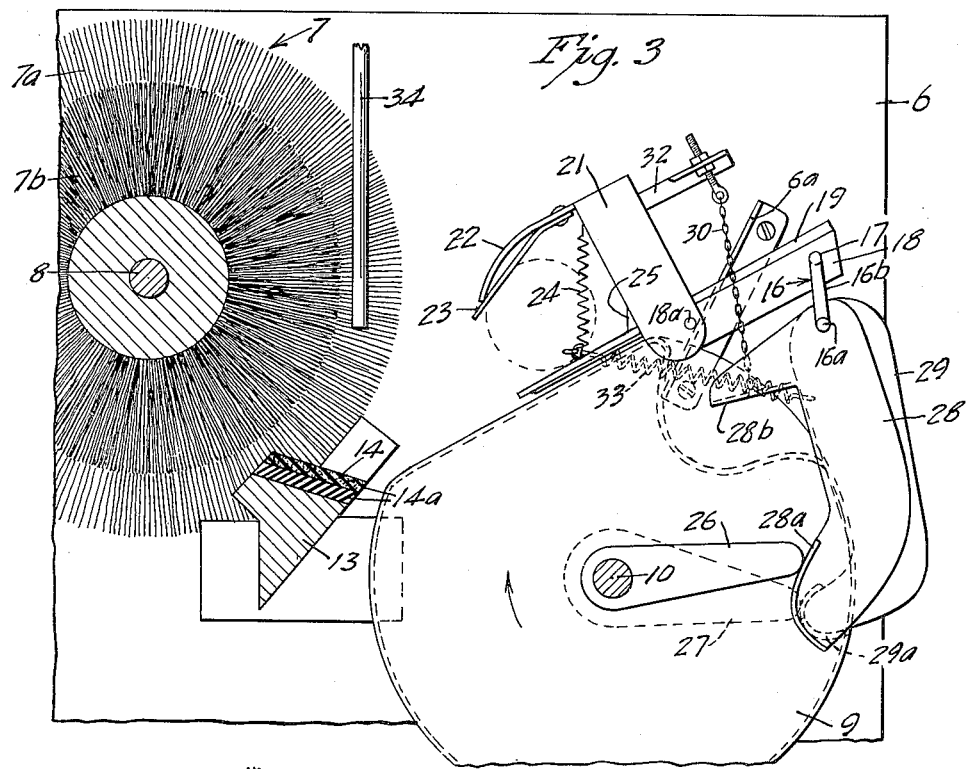
Fig. 3 is a similar view to Fig. 2 showing the feeder mechanism in feeder projected position immediately prior to releasing the egg.
Figure 4:
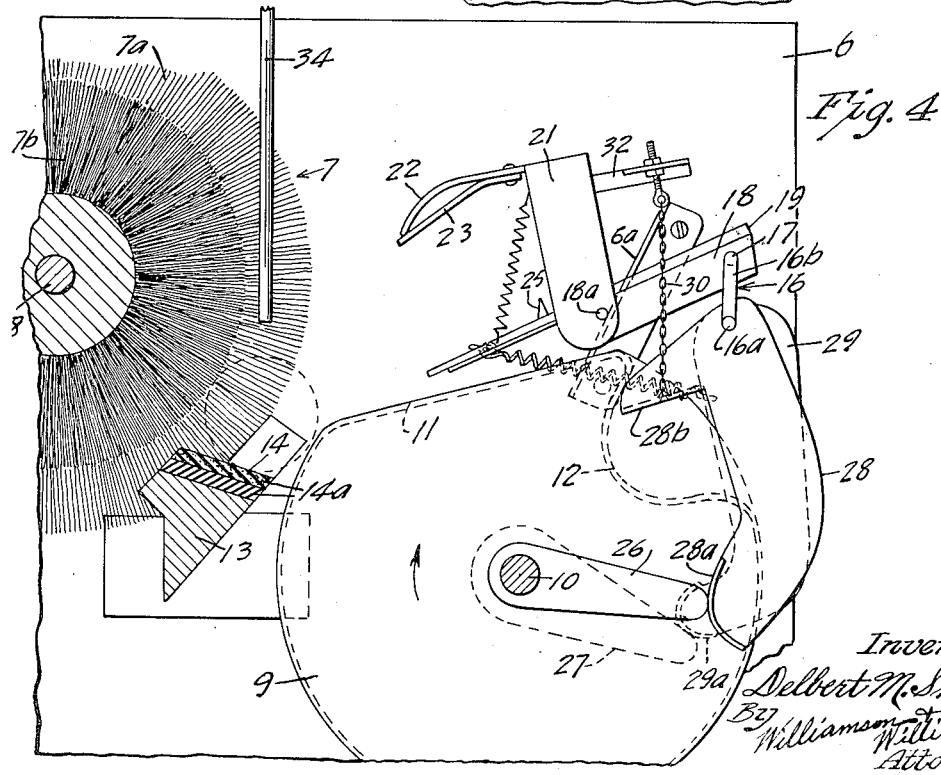
Fig. 4 is a similar view to Figs. 2 and 3 showing the egg feeder mechanism in releasing position.

A pair of cams 26 and 27 respectively are fixed to shaft 10 and are respectively disposed adjacent the sides of drum 9 for rotation therewith. As best shown in Figs. 2, 3, and 4, the two cams have generally similar contours; however, cam 27 leads cam 26 slightly. A pair of cam followers 28 and 29 are respectively mounted for engagement against the surfaces of cams 26 and 27. The follower 28 is pivoted to the stub shaft 16a nearest to cam 26, and the follower 29 is fixed to crank arm 16b nearest to cam 27 for actuating the crank shaft. Both cam followers have cam-engaging shoes 28a and 29a for engagement against the surface of the cams 26 and 27. The follower 28 has an outstanding lever arm 28b formed thereon, and a chain 30 is connected at its lower end to said lever arm. An egg stop actuating arm 32 is fixed to rocker arms 21 and extends rearwardly therefrom. The upper end of chain 30 is connected to the rear end of arm 32. A return spring 33 interconnects follower 29 at a point below pivot shaft 16a with the side 6 closest thereto to urge the follower 29 against the cam 27.

The following is a description of the operation of my improved feeder mechanism, the operation of the rest of the egg cleaning machine being similar to that described in my above identified co-pending application. The return spring 33 holds the cam follower 29 in engagement with cam 27 which normally holds said chute 18 in retracted position as shown in Fig. 2. When the maximum lift of the cam 27 reaches the follower 29, the chute 18 is projected forwardly by the crank action of the follower on crank arm 16b, the crank shaft swinging on stub shafts 16a. The ends of shaft 18a ride down the guides 6a and support the chute 18 as it moves forwardly and downwardly. This forward projection carries the lower end of the chute downwardly toward the egg-receiving recess 14. The release mechanism for the egg stop 22 is operated by the follower 28 and the cam 26. There is a slight lag between the cams 26 and 27, and the maximum lift of the cam 27 leads the maximum lift of the cam 26. The instant that the lower end of the chute 18 reaches its discharge position in closely spaced relation to the egg-supporting recess 14, the cam 26 actuates follower 28 in the following manner.

The spring 24 normally holds rocker arms 20 and 21 in retracted position against abutment elements 25 to resiliently urge said egg stop 22 downwardly in egg-retaining position and also through the link 30 said spring 24 maintains contact between follower 28 and cam 26. The cam 26 pivots the follower 28 on its crank arm 16a shifting lever arm 28b downwardly and pulling downwardly on actuating arm 32 which is fixed to rocker arm 21 and thereby swings rocker arms 20 and 21 rearwardly on pivot shaft 18a to raise egg stop 22 and release the egg retained thereunder. The flap 23 remains in engagement with the top surface of the egg to slightly retard its downward movement and ease it onto the egg support 13. Fig. 3 shows the feeder mechanism immediately before the discharge of the egg, and Fig. 4 shows the feeder mechanism in discharging position. The lower end portion of the chute 18 is guided by the guides 6a and is retained a slight distance above the outer periphery of drum 9 as said chute is shifted by the cam 27 and follower 29. The drum 9 with its flattened portion 11 permits the chute 18 to be projected into close association with the egg support 13, and the recess 12 receives the clean egg in a manner similar to that disclosed in my above identified co-pending application and carries the clean egg around to a collection location. The drum 9 also serves to rotate the egg during the cleaning operation in a manner similar to that described in said co-pending application, and a water supply tube 34 furnishes a stream of water to aid the cleaning operation and facilitate quick and thorough cleaning of the egg.

It will be seen that I have provided an extremely simple and highly efficient feeder mechanism for egg cleaning machines which is adapted to carry the egg downwardly and forwardly to a point in close proximity to the cleaning position of the egg and thereafter to release the egg to be cleaned, flap 23 retarding the downward movement of the egg to gently place the egg in said egg-supporting recess 14. After the egg has been released, the feeder mechanism is retracted into normal position and another egg to be cleaned is placed thereon. The longitudinal axis of an egg to be cleaned is disposed transversely of the chute 18 and retains this transverse position throughout the entire cleaning process as well as during the discharge of the cleaned egg to a collection location.

It will, of course, be understood that various changes may be made in the form, details, arrangement and proportions of the parts without departing from the scope of my invention.

What I claim is:

1. A feeder device for successively feeding, one at a time, articles having a continuously rounded outer periphery, said device comprising a supporting structure, a crank shaft journalled for oscillation on said structure, a projectable article-carrying chute disposed in slightly inclined relation to position articles carried thereby at the lower discharge end thereof and having a portion thereof connected to said crank shaft for oscillation therewith, an actuating cam mounted on said structure and adapted to be driven, a cam follower connected to said crank shaft for oscillating the same and riding on said actuating cam, said follower being connected with said crank shaft to periodically shift the inclined projectable chute into projected discharge position, and releasable stop means for normally holding the article at the discharge end of said chute but releasable when said chute is in projected position.

2. A feeder device for successively feeding articles, one at a time, from one position to another, said device comprising a longitudinally projectable generally slightly inclined relative to the horizontal, article stop means shiftably mounted at the discharge end of said chute and normally retaining an article thereon, chute shifting means connected with the chute for projecting the same longitudinally in substantially the inclined plane thereof toward a discharge position, releasing means shifting said article stop means into releasing position when said chute has been projected into discharge position, a cam actuated mechanism connected with said chute for projecting the same into a discharge position and for subsequently retracting the same, and a second cam-actuated mechanism synchronized with said first said cam actuated mechanism and connected with said article stop means for shifting the same into releasing position when said chute is in projected discharge position.

DELBERT M. SMITH.

References Cited in the file of this patent

UNITED STATES PATENTS

| Number | Name | Date |
|---|---|---|
| 317,601 | Welker, Jr. | May 12, 1885 |
| 842,601 | Woodson et al. | Jan. 29, 1907 |
| 1,626,410 | Halstead | Apr. 26, 1927 |
| 2,247,787 | Schmidt | July 1, 1941 |
| 2,297,067 | Morgan | Sept. 29, 1942 |